United States Patent
Ramesh

(10) Patent No.: US 6,449,464 B1
(45) Date of Patent: Sep. 10, 2002

(54) METHOD OF REPORTING SIGNAL QUALITY MEASUREMENTS FROM A MOBILE TERMINAL WITH ENHANCED DEMODULATION ALGORITHM

(75) Inventor: Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/473,458

(22) Filed: Dec. 28, 1999

(51) Int. Cl.$^7$ ................................................ H04B 1/00
(52) U.S. Cl. ..................... 455/70; 455/522; 455/226.2; 455/550; 375/140; 375/147; 375/316
(58) Field of Search ........................... 455/522, 69, 70, 455/68, 303, 314, 315, 226.2–226.3, 550, 67.1; 375/130, 140, 144, 147, 265, 316; 370/252, 333

(56) References Cited

U.S. PATENT DOCUMENTS

| 5,673,291 A | | 9/1997 | Dent |
| 6,034,952 A | * | 3/2000 | Dohi et al. ................. 455/522 |
| 6,317,587 B1 | * | 11/2001 | Tiedemann, Jr. et al. ..... 455/69 |

FOREIGN PATENT DOCUMENTS

| EP | 0 389 848 A2 | 10/1990 |
| EP | 0 683 570 A2 | 11/1995 |
| WO | WO 97/18643 | 5/1997 |
| WO | WO 99/39472 | 8/1999 |

* cited by examiner

Primary Examiner—Doris H. To
(74) Attorney, Agent, or Firm—Coats & Bennett, P.L.L.C.

(57) ABSTRACT

Wireless communications mobile terminals demodulate incoming signals according to two different demodulation algorithms. The first algorithm is the primary algorithm used by the mobile terminal to prepare the signals for higher protocol level processing, called the enhanced algorithm. The second algorithm is a secondary algorithm used primarily to determine error rates to be reported back to the base station, called the basic, or conventional, algorithm. The enhanced algorithm provides improved performance as compared to the basic algorithm. The mobile terminal reports signal quality measurements to the wireless communications system based on the demodulation using the basic algorithm, rather than those based on the enhanced algorithm. In alternate embodiments, the mobile terminal does not actually demodulate according to the basic algorithm, but instead maps the results from the enhanced algorithm to what the expected results would be with the basic algorithm. In either case, the signal quality measurements reported to the wireless communications system are conceptually those of the basic algorithm, not the enhanced algorithm. As such, the wireless communications system should respond as if the mobile terminal is using the basic algorithm, thereby allowing the mobile terminal to retain its performance advantage gained by using the enhanced algorithm.

26 Claims, 3 Drawing Sheets

METHOD OF REPORTING SIGNAL QUALITY MEASUREMENTS FROM A MOBILE TERMINAL WITH ENHANCED DEMODULATION ALGORITHM

BACKGROUND OF THE INVENTION

The present invention relates to wireless communication systems, and more particularly, to a method of reporting signal quality measurements from a wireless communications mobile terminal.

The present invention is particularly applicable to mobile terminals that employ improved demodulation/decoding algorithms to improve the performance perceived by the end-user. An example of such a mobile terminal would be a mobile terminal employing a multi-pass demodulation algorithm wherein class 1a bits that had been attained from a channel decoder are used to improve the quality of class 2 bits that are uncoded by performing an improved demodulation with the knowledge of the decoded class 1a bits. It is expected that such a multi-pass demodulation algorithm would result in improved performance as perceived by the user, compared with a mobile terminal that does not employ such an algorithm provided the carrier-to-interference ratios seen by the mobile terminals are similar.

A mobile terminal is typically required to record and report measurements of quantities such as the bit error rate and frame error rate perceived by the mobile terminal. These reported measurements are used by the wireless communications system to adjust its transmit power and to change the carrier to interference ratio. However, these values are dependent upon the demodulation/decoding algorithm used. Thus, an improved demodulation/decoding algorithm, such as a multi-pass demodulation approach, will result in improved, i.e., "better," error measurements. When these better error measurements are reported to the wireless communications system, the system may respond by lowering power, etc., resulting in an increased error rates at the mobile terminal. Thus, an improved demodulation/decoding algorithm may act to extend the acceptable performance range, but the system may respond by using up the extra margin provided, resulting in no net increase in performance as perceived by the user. In such a situation, it is clear that the performance advantage perceived by the user through the use of the enhanced demodulation/decoding algorithm could be lost, and the benefit of implementing the improved algorithms is lost to the equipment manufacturer.

Thus, in order to preserve the performance advantage associated with improved demodulation/decoding algorithms, a new method of reporting signal quality measurements from a wireless communications mobile terminal method is needed.

SUMMARY OF THE INVENTION

The present invention helps preserve the performance improvements offered by enhanced demodulation algorithms so that such improvements may be perceived by the user. In preferred embodiments, mobile terminals operating according to the present invention demodulate incoming signals according to two different demodulation algorithms. The first algorithm is the primary algorithm used by the mobile terminal to prepare the signals for higher protocol level processing. For ease of reference, this algorithm is called the enhanced algorithm. The second algorithm is a secondary algorithm used primarily to determine error rates to be reported back to the base station. For ease of reference, this algorithm is called the basic, or conventional, algorithm.

As will be apparent from the discussion below, the basic algorithm should be good enough to meet the demodulation performance specifications on the operation of the mobile terminal as set forth in the appropriate standard. The enhanced algorithm provides improved performance as compared to the basic algorithm, which implies that under similar signal to impairment conditions, the enhanced algorithm is expected to generate fewer errors than the basic algorithm for the same input signals.

Like the prior art, a mobile terminal operating according to the present invention reports signal quality measurements to the wireless communications system. However, the reported signal quality measurements are not those resulting directly from the use of the enhanced algorithm. The mobile terminal instead calculates the required measurements based on the demodulation using the basic algorithm and reports these values to the wireless communications system, rather than those based on the enhanced algorithm. In alternate embodiments, the mobile terminal does not actually demodulate according to the basic algorithm, but instead maps the results from the enhanced algorithm to what the expected results would be with the basic algorithm. In either case, the signal quality measurements reported to the wireless communications system are conceptually those of the basic algorithm, not the enhanced algorithm. As such, the wireless communications system should respond as if the mobile terminal is using the basic algorithm, thereby allowing the mobile terminal to retain its performance advantage gained by using the enhanced algorithm.

DETAILED DESCRIPTION OF THE INVENTION

Figure 1:
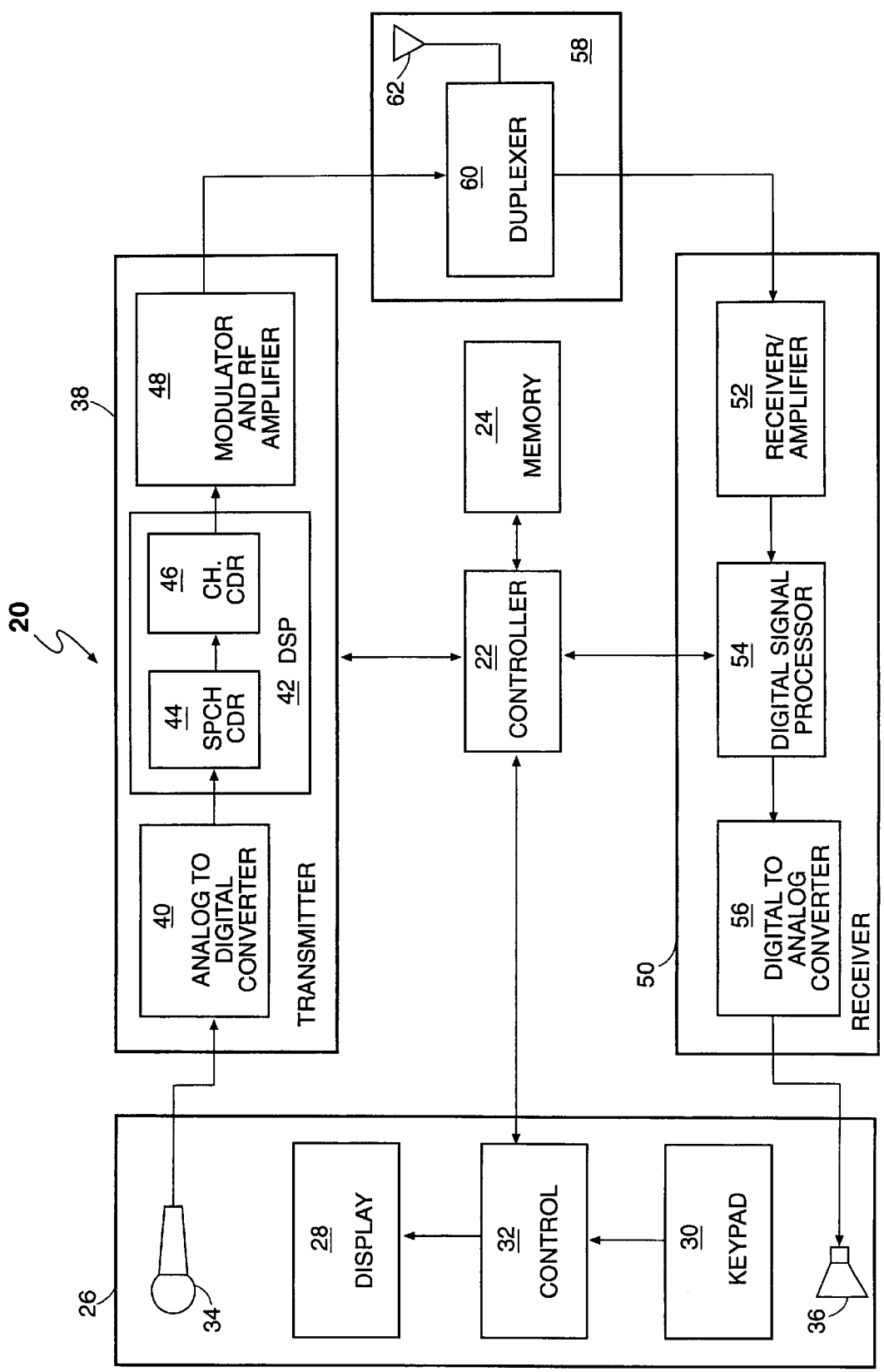
FIG. 1 is a schematic of one embodiment of a wireless communications mobile terminal suitable for use with the present invention.

The following description is written in terms of a cellular radiotelephone system, but it will be understood that the invention is not necessarily limited to that environment. More specifically, the following description is written using terms which may be associated with ANSI-136 compliant systems, but it will be understood by those skilled in the art that the present invention may be implemented in other wireless communication environments including those which are designed in accordance with other standards, e.g., Global System for Mobile Communications (GSM), IS-95, or Personal Digital Cellular (PDC), as well as those which use a wide range of access methodologies, e.g., Time Division Multiple Access (TDMA), Frequency Division Multiple Access (FDMA), Code Division Multiple Access (CDMA), cdma2000, Wideband Code Division Multiple Access (WCDMA), both terrestrial and satellite based.

The present invention functions primarily in the context of a wireless communications mobile terminal. A digital cellular telephone will be used as an illustrative example of a wireless communications mobile terminal to describe the present invention; however, it is to be understood that the present invention is not limited to digital cellular telephones. Indeed, the present invention may be utilized in a wide variety of wireless communications mobile terminals, for example cellular telephones, satellite phones, personal digital assistants, wireless communications PCMCIA modules, and the like.

A mobile terminal 20 typically includes a controller 22, an operator interface 26, a transmitter 38, a receiver 50, and an antenna assembly 58. The operator interface 26 typically includes a display 28, keypad 30, control unit 32, microphone 34, and a speaker 36. The display 28 allows the operator to see dialed digits, call status, and other service information. The keypad 30 allows the operator to dial numbers, enter commands, and select options. The control unit 32 interfaces the display 28 and keypad 30 with the controller 22. The microphone 34 receives acoustic signals from the user and converts the acoustic signals to an analog electrical signal. The speaker 36 converts analog electrical signals from the receiver 50 to acoustic signals which can be heard by the user.

The analog electrical signal from the microphone 34 is supplied to the transmitter 38. The transmitter 38 includes an analog to digital converter 40, a digital signal processor 42, and a modulator and RF amplifier 48. The analog to digital converter 40 changes the analog electrical signal from the microphone 34 into a digital signal. The digital signal is passed to the digital signal processor (DSP) 42, which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the modulator and RF amplifier 48, which are shown as a combined unit in FIG. 1. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52, which shifts the frequency spectrum, and boosts the low-level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the controller 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to the speaker 36 to generate acoustic signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62. In TDMA mobile terminals that do not need to transmit and receive at the exact same time, a transmit/receive switch (not shown) may be used instead of duplexer 60.

The controller 22 coordinates the operation of the transmitter 38 and the receiver 50, and may for instance take the form of a common microprocessor. This coordination includes power control, channel selection, timing, as well as a host of other functions known in the art. The controller 22 inserts signaling messages into the transmitted signals and extracts signaling messages from the received signals. The controller 22 responds to any base station commands contained in the signaling messages, and implements those commands. When the user enters commands via the keypad 30, the commands are transferred to the controller 22 for action. Memory 24 stores and supplies information at the direction of the controller 22 and preferably includes both volatile and non-volatile portions.

The mobile terminal 20 may demodulate incoming signals, typically with the demodulator within the digital signal processor 54, according to two different demodulation algorithms. For ease of reference, these algorithms are referred to herein as the enhanced algorithm and the basic (or conventional) algorithm. As described above, the enhanced algorithm is the primary algorithm used by the mobile terminal to prepare the signals for higher protocol level processing while the basic algorithm is a secondary algorithm used primarily to determine error rates to be reported back to the base station. The enhanced algorithm provides improved performance as compared to the basic algorithm, meaning the enhanced algorithm generates fewer errors given the same inputs for the majority of incoming signals. For instance, the enhanced algorithm may employ a multi-pass approach, while the basic algorithm may employ only a single-pass approach. For an example of using two different algorithms, albeit in different receivers, see the 1999 IEEE Vehicular Technology Conference paper entitled "Co-Channel Interference Cancellation for D-AMPS Handsets." This paper describes a conventional receiver (basic algorithm) and a joint demodulation technique for interference cancellation (enhanced algorithm). As another example of an enhanced algorithm, in particular, a multipass enhanced algorithm, see U.S. Pat. No. 5,673,291 to Dent entitled "Simultaneous Demodulation and Decoding of a Digitially Modulated Radio Signal Using Known Symbols," which is incorporated herein by reference.

Figure 2:
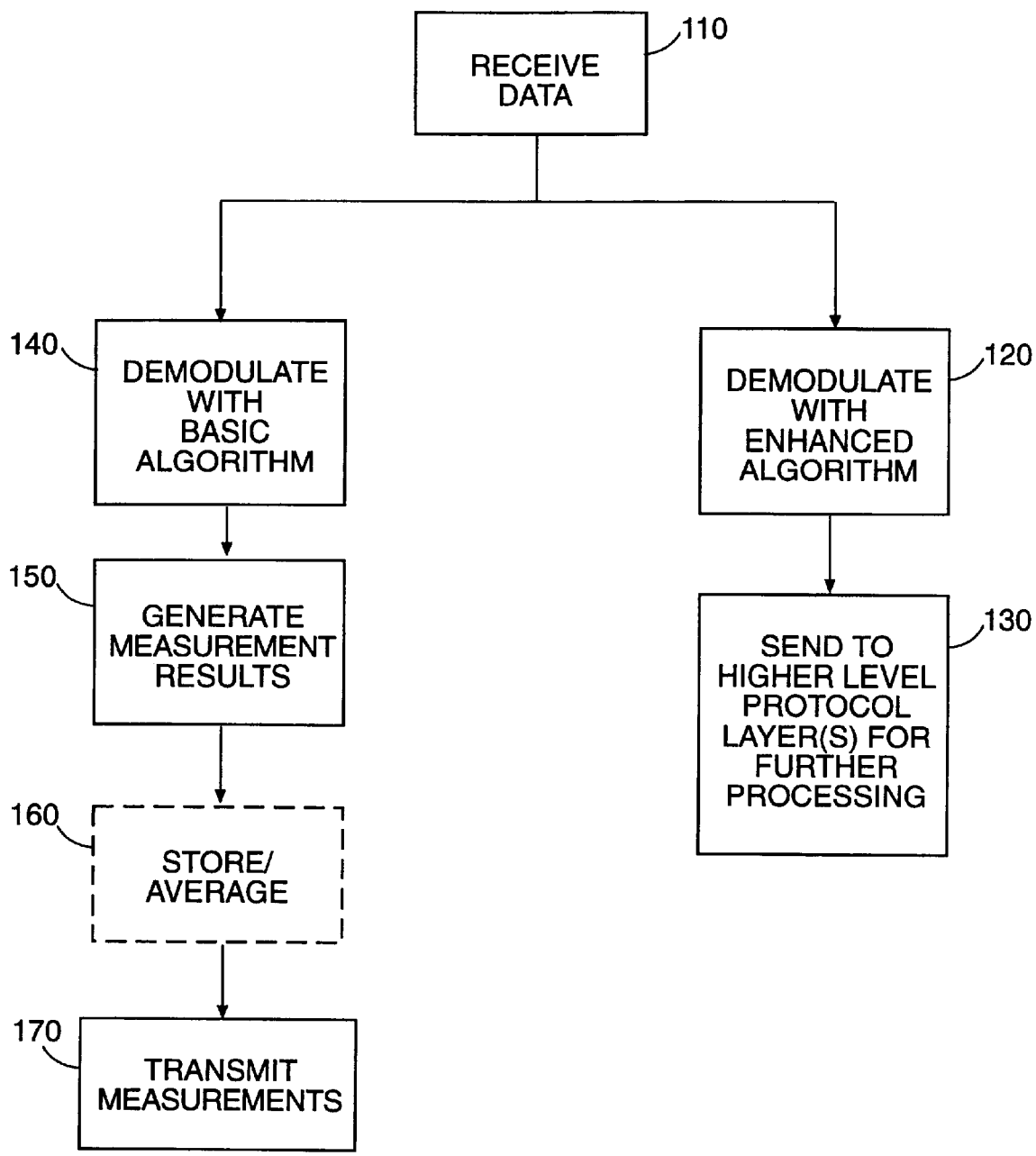
FIG. 2 is a flow chart of one embodiment of the measurement reporting method of the present invention.

Referring to FIG. 2, the present invention begins by receiving incoming data (box 110). This data is logically fed to two different process branches. In one branch, the received data is demodulated using the enhanced algorithm (box 120) and then passed to the higher protocol levels for further processing (box 130). In the other branch, the received signal is demodulated using the basic algorithm (box 140) and signal quality measurements are performed in the customary fashion (box 150) For example, the bit error rate and the frame error rate may be calculated. If appropriate, these signal quality measurements are stored in memory and/or averaged and stored in memory (box 160). When appropriate under the operating protocol, the mobile terminal 20 then transmits the signal quality measurements, either averaged or not, to the wireless communications system (box 170) as reported signal quality measurements. The wireless communications system uses these reported signal quality measurements to adjust its transmit power, thereby adjusting the carrier-to-interference ratio seen by the mobile station, and the like, as necessary and conventional in the art. Thus, the signal quality measurement reported to the wireless communications system by the mobile terminal 20 are those signal quality measurements based on the basic algorithm, rather than any signal quality measurements based on the enhanced algorithm.

By reporting signal quality measurements based on the basic algorithm, the mobile terminal 20 operating according to the present invention is provided with means to preserve the intended perceived improvement in performance as a result of the use of the enhanced demodulation algorithm. Thus, manufacturers of such mobile terminals 20 will have an incentive to develop improved demodulation algorithms because the improvements may manifest themselves to users rather than being counter-acted by the automated control responses of the wireless communications systems.

It should be noted that in mobile terminals 20 utilizing interference cancellation, a separate receiver chain performing a conventional demodulation step may be employed to perform the operations of boxes 140–150. One advantage of such an arrangement is that the results from the conventional demodulation routine may be used as back-up to the enhanced demodulation routine, as there are isolated cases where the enhanced demodulator could perform worse than the conventional demodulation routine.

Figure 3:
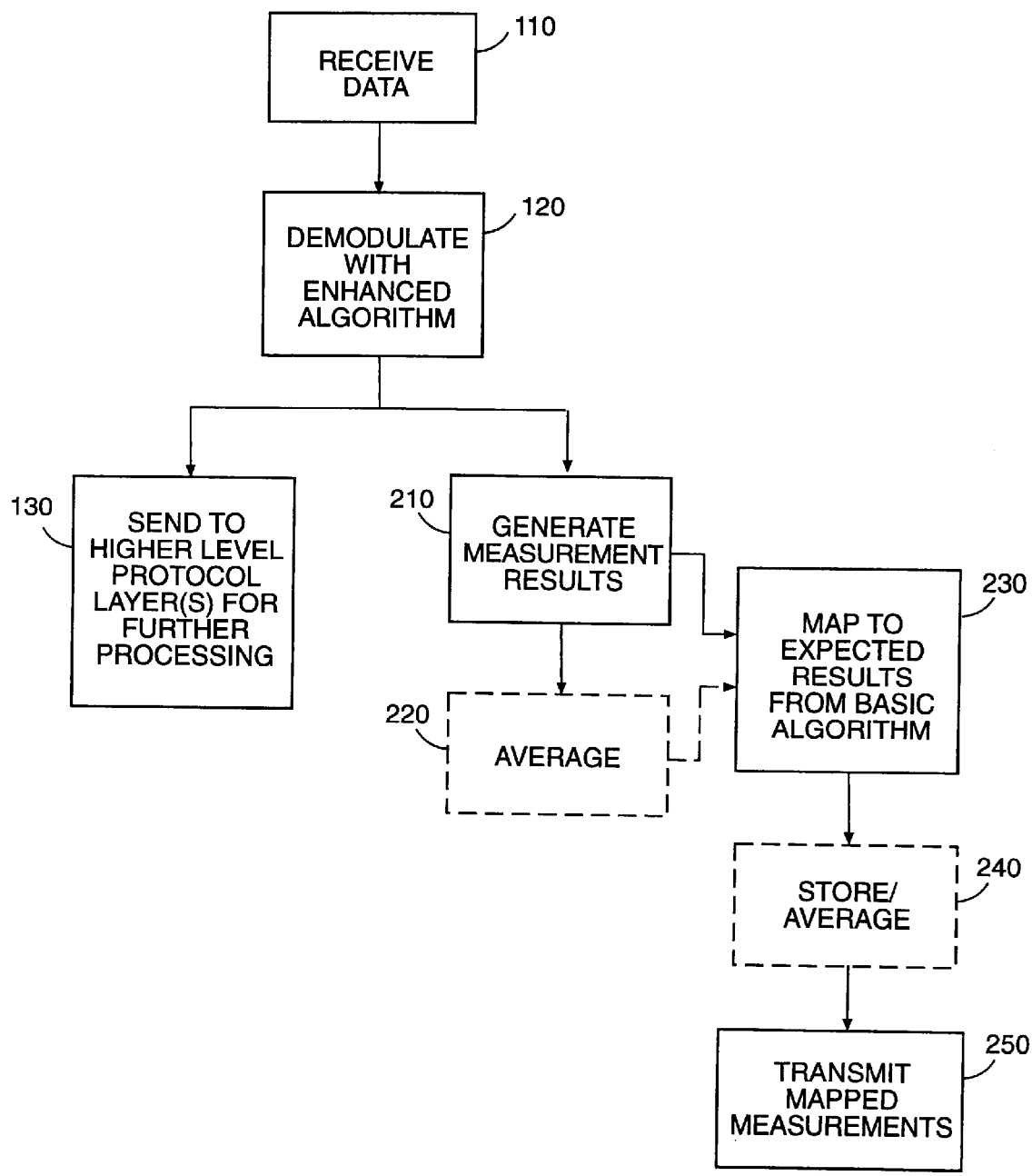
FIG. 3 is a flow chart of another embodiment of the measurement reporting method of the present invention.

In an alternate embodiment, shown in FIG. 3, the received signal (box 110) is not subjected to the basic demodulation algorithm per se. Rather, the signal is demodulated using the enhanced algorithm (box 120). The output from the enhanced algorithm is then sent to the higher protocol levels for further processing (box 130) as before, and also used to generate internal signal quality measurements (box 210). The internal signal quality measurements are then further processed, based on knowledge of the improvement in perceived signal quality provided by the enhanced algorithm over the basic algorithm, to generate mapped signal quality measurements (box 230). That is, knowledge of the gain of the enhanced demodulator over a conventional one is used in conjunction with measurements obtained using the enhanced algorithm (i.e., the internal signal quality measurements) to deduce the measurements that would be obtained by using the conventional algorithm. Optionally, the internal signal quality measurements may be averaged prior to this further processing (box 220). These mapped signal quality measurements are then stored in memory and/or averaged and stored in memory (box 240). When appropriate under the operating protocol, the mobile terminal 20 then transmits the signal mapped quality measurements, either averaged or not, to the wireless communications system (box 250) as reported signal quality measurements. The wireless communications system responds to the reported quality measurements as described above.

The description of the invention above has referred to protocol levels. This terminology is believed well understood by those of ordinary skill in the art. For instance, in the OSI reference model well known in the art, there are typically seven protocol levels, with the physical layer being the lowest and the application layer being the highest. Similarly, the ANSI-136 specifications, such as ANSI/TIA/EIA-136-000-1999 through ANSI/TIA/EIA-136-910-1999, well known in the art, define the functions of several protocol levels. It is this concept of protocol levels, as generally set forth in various well known industry references, that is intended by this application.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of reporting signal measurements by a mobile terminal to a wireless communications system, comprising:
   receiving, at the mobile terminal, a signal from the wireless communications system;
   demodulating said received signal using a first demodulation algorithm to create a first demodulated signal;
   demodulating said received signal using a second demodulation algorithm to create a second demodulated signal;
   wherein said demodulating said received signal using said first demodulation algorithm occurs independently of said second demodulated signal;
   reporting signal quality to said wireless communications system based on said second demodulated signal; and
   passing said first demodulated signal to a higher protocol level.

2. The method of claim 1 further including generating values representing signal quality based on said second demodulated signal and storing said values.

3. The method of claim 1 wherein said first demodulation algorithm is enhanced with respect to said second demodulation algorithm.

4. The method of claim 1 wherein said signal quality reported to said wireless communications system is a function of bit error rate of said second demodulated signal.

5. The method of claim 1 wherein said signal quality reported to said wireless communications system is a function of frame error rate of said second demodulated signal.

6. The method of claim 1 wherein said signal quality reported to said wireless communications system is a function of both bit error rate and frame error rate of said second demodulated signal.

7. The method of claim 1 further including discarding said second demodulated signal without passing said second demodulated signal to said higher protocol level.

8. A method of reporting signal measurements by a mobile terminal to a wireless communications system, comprising:
   receiving, at the mobile terminal, a signal from the wireless communications system;
   demodulating said received signal using a first demodulation algorithm to create a first demodulated signal;
   demodulating said received signal using a second demodulation algorithm to create a second demodulated signal;
   wherein said first demodulation algorithm is enhanced with respect to said second demodulation algorithm and wherein said first demodulation algorithm is a multi-pass demodulation algorithm and said second demodulation algorithm is at single pass demodulation algorithm;
   reporting signal quality to said wireless communications system based on said second demodulated signal; and
   passing said first demodulated signal to a higher protocol level.

9. A method of reporting signal measurements by a mobile terminal to a wireless communications system, comprising:
   receiving, at the mobile terminal, a signal from the wireless communications system;
   demodulating said received signal using a first demodulation algorithm to create a first demodulated signal;
   demodulating said received signal using a second demodulation algorithm to create a second demodulated signal;
   reporting signal quality to said wireless communications system based on said second demodulated signal;
   wherein said first demodulation algorithm is a multi-pass demodulation algorithm and said second demodulation algorithm is a single pass demodulation algorithm and wherein said signal quality reported to said wireless communications system is a function of both bit error rate and frame error rate of said second demodulated signal and further including:

generating values representing signal quality based on said second demodulated signal and storing said values at said mobile terminal, and discarding said second demodulated signal without passing said second demodulated signal to said higher protocol level; and passing said first demodulated signal to a higher protocol level.

10. A method of reporting signal measurements by a mobile terminal to a wireless communications system, comprising:

receiving, at the mobile terminal, a signal from the wireless communications system;

demodulating the received signal using a first demodulation algorithm to create a first demodulated signal;

mapping signal quality measurements based on said first demodulated signal to represent the signal quality of said received signal demodulated according to a second demodulation algorithm;

reporting said signal quality measurements to said wireless communications system; and passing said first demodulated signal to a higher protocol level.

11. The method of claim 10 wherein said mapping signal quality measurements based on said first demodulated signal to represent the signal quality of said received signal demodulated according to a second demodulation algorithm includes determining, based on said first demodulated signal, what signal quality measurements of said received signal would be if said received signal was demodulated using a second demodulation algorithm, without demodulating said received signal using said second demodulation algorithm.

12. The method of claim 11 wherein said first demodulation algorithm is enhanced with respect to said second demodulation algorithm.

13. The method of claim 12 wherein said first demodulation algorithm is a multi-pass demodulation algorithm and said second demodulation algorithm is a single pass demodulation algorithm.

14. The method of claim 11 wherein said signal quality reported to said wireless communications system is function of what the bit error rate of said received signal would be if said received signal was demodulated using said second demodulation algorithm.

15. The method of claim 11 wherein said signal quality reported to said wireless communications system is function of what the frame error rate of said received signal would be if said received signal was demodulated using said second demodulation algorithm.

16. The method of claim 11 wherein said signal quality reported to said wireless communications system is function of what both the bit error rate and the frame error rate of said received signal would be if said received signal was demodulated using said second demodulation algorithm.

17. The method of claim 10 wherein said first demodulation algorithm is a multi-pass demodulation algorithm and said second demodulation algorithm is a single pass demodulation algorithm; said mapping signal quality measurements based on said first demodulated signal to represent the signal quality of said received signal demodulated according to a second demodulation algorithm includes determining, based on said first demodulated signal, what signal quality measurements of said received signal would be if said received signal was demodulated using a second demodulation algorithm, without demodulating said received signal using said second demodulation algorithm; and said signal quality reported to said wireless communications system is function of what both the bit error rate and the frame error rate of said received signal would be if said received signal was demodulated using said second demodulation algorithm.

18. A method of reporting signal measurements by a mobile terminal to a wireless communications system, comprising:

receiving, at the mobile terminal, a signal from the wireless communications system;

demodulating the received signal using a first demodulation algorithm to create a first demodulated signal;

passing said first demodulated signal to a higher protocol level;

generating pseudo signal quality measurements of said received signal based on said first demodulated signal, said pseudo signal quality measurements corresponding to signal quality measurements which would be obtained if said received signal was demodulated using a second demodulation algorithm, without actually demodulating said received signal using said second demodulation algorithm; and reporting said pseudo signal quality measurements to said wireless communications system.

19. The method of claim 18 wherein said first demodulation algorithm is enhanced with respect to said second demodulation algorithm.

20. The method of claim 19 wherein said first demodulation algorithm is a multi-pass demodulation algorithm and said second demodulation algorithm is a single pass demodulation algorithm.

21. A wireless communications mobile terminal for operation in a wireless communications system, comprising:

a receiver adapted to output a received signal based on signals received from the wireless communications system;

control logic in communication with said receiver and having a first demodulation algorithm and a second demodulation algorithm, said control logic adapted to demodulate the received signal using said first demodulation algorithm to create a first demodulated signal and to pass said first demodulated signal to a higher protocol level; said control logic further adapted to demodulate said received signal using said second demodulation algorithm to create a second demodulated signal;

wherein said first demodulation algorithm creates said first demodulated signal independently of said second demodulated signal; and a transmitter in communication with said control logic, said transmitter transmitting said signal quality measurements based on said second demodulated signal to said wireless communications system under the control of said control logic.

22. The mobile terminal of claim 21 wherein said first demodulation algorithm is enhanced with respect to said second demodulation algorithm.

23. A wireless communications mobile terminal for operation in a wireless communications system, comprising:

a receiver adapted to output a received signal based on signals received from the wireless communications system;

control logic in communication with said receiver and having a first demodulation algorithm and a second demodulation algorithm, said control logic adapted to demodulate the received signal using said first demodulation algorithm to create a first demodulated signal and to pass said first demodulated signal to a higher protocol level; said control logic further adapted to demodulate said received signal using said second demodulation algorithm to create a second demodulated signal;

wherein said first demodulation algorithm is enhanced with respect to said second demodulation algorithm and wherein said first demodulation algorithm is a multi-pass demodulation algorithm and said second demodulation algorithm is a single pass demodulation algorithm; and a transmitter in communication with said control logic, said transmitter transmitting said signal quality measurements based on said second demodulated signal to said wireless communications system under the control of said control logic.

24. A wireless communications mobile terminal for operation in a wireless communications system, comprising:

a receiver adapted to output a received signal based on signals received from the wireless communications system;

a logic circuit in communication with said receiver and adapted to demodulate the received signal using a first demodulation algorithm to create a first demodulated signal and to pass said first demodulated signal to a higher protocol level;

said logic circuit further adapted to generate pseudo signal quality measurements of said received signal based on said first demodulated signal, said pseudo signal quality measurements corresponding to signal quality measurements which would be obtained if said received signal was demodulated using a second demodulation algorithm, without actually demodulating said received signal using said second demodulation algorithm; and a transmitter in communication with said logic circuit, said transmitter reporting said pseudo signal quality measurements to said wireless communications system.

25. The mobile terminal of claim 24 wherein said first demodulation algorithm is a multi-pass demodulation algorithm and said second demodulation algorithm is a single pass demodulation algorithm.

26. A method of reporting signal measurements by a mobile terminal to a wireless communications system, comprising:

receiving, at the mobile terminal, a signal from the wireless communications system;

demodulating said received signal using a first demodulation algorithm to create a first demodulated signal;

demodulating said received signal using a second demodulation algorithm to create a second demodulated signal;

wherein said first demodulation algorithm is not dependent on said second demodulated signal to create said first demodulated signal;

reporting signal quality to said wireless communications system based on said second demodulated signal; and passing said first demodulated signal to a higher protocol level.

* * * * *